US012779952B2

(12) United States Patent
Schultz et al.

(10) Patent No.: US 12,779,952 B2
(45) Date of Patent: Nov. 3, 2026

(54) TWO-PIECE WINDOW SYSTEM HAVING REMOVABLE GLASS PANEL

(71) Applicant: FCA US LLC, Auburn Hills, MI (US)

(72) Inventors: Jason E Schultz, Clarkston, MI (US); Sahas Chakilam, Novi, MI (US); David W Pennala, Howell, MI (US)

(73) Assignee: FCA US LLC, Auburn Hills, MI (US)

( * ) Notice: Subject to any disclaimer, the term of this patent is extended or adjusted under 35 U.S.C. 154(b) by 607 days.

(21) Appl. No.: 18/183,707

(22) Filed: Mar. 14, 2023

(65) Prior Publication Data

US 2024/0308301 A1 Sep. 19, 2024

(51) Int. Cl.

| | |
|---|---|
| ***B60J 1/00*** | (2006.01) |
| ***B60J 1/02*** | (2006.01) |
| ***B60J 1/08*** | (2006.01) |
| ***E05C 3/04*** | (2006.01) |
| *B60J 10/21* | (2016.01) |
| *B60J 10/70* | (2016.01) |

(52) U.S. Cl.

CPC ............... *B60J 1/006* (2013.01); *B60J 1/007* (2013.01); *B60J 1/02* (2013.01); *B60J 1/085* (2013.01); *E05C 3/041* (2013.01); *B60J 10/21* (2016.02); *B60J 10/70* (2016.02)

(58) Field of Classification Search

CPC ...... B60J 1/17; B60J 1/085; B60J 1/006–007; B60J 1/12; B60J 1/02; B60J 1/025; B60J 1/1823; B60J 10/21; B60J 10/70; B60J 7/194–196; B60J 7/11; B60J 7/106; E05C 3/041–043

USPC ..................................................... 293/193.06

See application file for complete search history.

(56) References Cited

U.S. PATENT DOCUMENTS

| | | | | |
|---|---|---|---|---|
| 2,022,718 A * | 12/1935 | Heins | B60J 9/02 | 292/38 |
| 4,366,683 A * | 1/1983 | Labbe | E05C 3/08 | 70/211 |
| 4,548,434 A * | 10/1985 | Princell | B60J 7/19 | 292/223 |
| 4,700,525 A * | 10/1987 | Nieboer | B60J 10/70 | 52/204.591 |

(Continued)

FOREIGN PATENT DOCUMENTS

KR 20170025240 A * 3/2017 ............ B60J 5/0426

OTHER PUBLICATIONS

KR 200369570 (Year: 2004).*

*Primary Examiner* — Catherine A Kelly
*Assistant Examiner* — Patrick B. Ponciano
(74) *Attorney, Agent, or Firm* — Jeremy J. Klobucar

(57) ABSTRACT

A vehicle including a vehicle body including a movable body attached thereto. The movable body defines an opening configured for receipt of a window system. The window system includes a fixed panel that is fixed to the movable body, a removable panel that is configured to be attached to and detached from the fixed panel, and a plurality of retention features that are configured to attach the removable panel to the fixed panel. The plurality of retention features each include a rotatable latch attached to the removable panel that is configured to engage with a receiver to attach the removable panel to the fixed panel. Adjacent rotatable latches are configured to rotate in a direction toward each other to disengage from the receiver and mate with each other to collectively form a graspable handle to remove the detach the removable panel from the fixed panel.

16 Claims, 9 Drawing Sheets

(56) References Cited

U.S. PATENT DOCUMENTS 5,326,140 A * 7/1994 Randall .................... E05C 3/02
292/229
5,367,828 A * 11/1994 Hashemnia ........... E05D 15/502
49/382
5,441,005 A * 8/1995 Freeman ............... E05B 53/003
292/51
5,551,197 A * 9/1996 Repp ......................... B60J 1/14
52/204.69
5,791,727 A * 8/1998 Doescher ................... B60J 1/14
296/146.16
6,378,931 B1 * 4/2002 Kolluri .................... B60J 10/70
52/204.63
7,008,011 B2 * 3/2006 Gevay ........................ B60J 7/11
49/141
7,076,919 B2 * 7/2006 Katakura ................... B60J 1/14
296/146.16
7,240,960 B2 * 7/2007 Fallis, III ............... B60J 7/1291
296/218
8,066,319 B2 * 11/2011 Hafften ................... E05B 83/01
296/146.1
8,333,036 B2 * 12/2012 Helms ..................... E05B 77/44
49/141
8,408,623 B1 * 4/2013 McAuliff ................. B60J 1/085
296/210
9,452,722 B2 * 9/2016 Weigert .................. H01F 38/14
11,053,715 B2 * 7/2021 Damboiu .............. E05B 39/007
11,111,705 B2 * 9/2021 Lipson ................ E05B 15/0086
11,571,954 B2 * 2/2023 Prather ...................... B60J 7/11
11,584,206 B2 * 2/2023 Boyle .................... B60J 1/1853
11,999,219 B2 * 6/2024 Young ...................... B60J 1/085
12,202,320 B2 * 1/2025 Pennala ................... B60J 1/006
12,304,286 B2 * 5/2025 Bowman ................ B60J 5/0487
12,403,750 B2 * 9/2025 Snider .................... B60J 7/1621
2024/0253428 A1 * 8/2024 Schultz ................. E05C 19/009

* cited by examiner

TWO-PIECE WINDOW SYSTEM HAVING REMOVABLE GLASS PANEL

FIELD

The present disclosure relates to a two-piece window system having a removable glass panel.

BACKGROUND

This section provides background information related to the present disclosure which is not necessarily prior art.

It is known in the motor vehicle art to provide a convertible top, which may be folded back or removed from the vehicle. In one example, the convertible top is constructed of a rigid/hard material (e.g., referred to as a hard top). Such convertible tops provide the user with the benefit of open-air driving while affording available protection in the event of adverse weather conditions. However, hard tops typically must be removed as one or more large components, which can be very heavy, thus requiring multiple people or special equipment to completely remove those systems from the vehicle. Therefore, while such convertible tops work well for their intended purpose, it is desirable to provide improvements in the relevant art.

SUMMARY

This section provides a general summary of the disclosure and is not a comprehensive disclosure of its full scope or all its features.

According to a first aspect of the present disclosure there is provided a vehicle including a vehicle body including a movable body attached thereto. The movable body defines an opening configured for receipt of a window system. The window system includes a fixed panel that is fixed to the movable body, a removable panel that is configured to be attached to and detached from the fixed panel, and a plurality of retention features that are configured to attach the removable panel to the fixed panel. The plurality of retention features each include a rotatable latch attached to the removable panel that is configured to engage with a receiver to attach the removable panel to the fixed panel. Adjacent rotatable latches are configured to rotate in a direction toward each other to disengage from the receiver and mate with each other to collectively form a graspable handle to remove the detach the removable panel from the fixed panel.

According to the first aspect, each of the rotatable latches are L-shaped members including a first end configured to engage with the receiver when the removable panel is attached to the fixed panel, and configured to mate with the first end of the adjacent rotatable latch to form the graspable handle when the removable panel is to be detached from the fixed panel, and each of the rotatable latches including a second end rotatably attached to the removable panel.

According to the first aspect, each of the rotatable latches are configured to rotate 90 degrees.

According to the first aspect, each of the rotatable latches include a vibration attenuation feature at the first end that, when the first end of the rotatable latch is engaged with the receiver, attenuates vibrations experienced by the window system during operation of the vehicle; and when the first end of the rotatable latch is mated with the adjacent rotatable latch, the vibration attenuation feature is configured to mate with the first end of the adjacent rotatable latch.

According to the first aspect, the first end of each rotatable latch includes a recess configured for receipt of the vibration attenuation feature of the adjacent rotatable latch.

According to the first aspect, the movable body is a swing-gate including a swing-gate header that defines the opening.

According to the first aspect, the receiver is attached to either the swing-gate header or the fixed panel.

According to the first aspect, the fixed panel includes a plurality of locator clips bonded thereto that are configured to mate with a through-hole formed in the swing-gate header.

According to the first aspect, the window system may further include a seal positioned between the fixed panel and the removable panel.

According to the first aspect, the seal is attached to the fixed panel.

According to the first aspect, the seal includes a molded corner configured as an alignment feature to align the removable panel relative to the fixed panel when attaching the removable panel to the fixed panel.

According to the first aspect, the removable panel is configured to be flushly aligned with the fixed panel when the removable panel is attached to the fixed panel.

According to the first aspect, the removable panel is configured to be offset from the fixed panel when the removable panel is attached to the fixed panel.

According to the first aspect, when the adjacent rotatable latches collectively form the graspable handle, a space is provided between the graspable handle and the removable panel that is configured for receipt of an operator's hand.

According to the first aspect, each of the fixed panel and the removable panel are formed of glass.

According to a second aspect of the present disclosure, there is provided a vehicle including a vehicle body including a swing-gate pivotably attached thereto. The swing-gate defines an opening configured for receipt of a two-piece window system including a fixed panel that is fixed to the swing-gate; a removable panel that is configured to be attached to and detached from the fixed panel; and a plurality of retention features that are configured to attach the removable panel to the fixed panel. The plurality of retention features each include an L-shaped rotatable latch that includes a first end configured to engage with the receiver and an opposite second end rotatably attached to the removable panel. Adjacent rotatable latches are configured to rotate in a direction toward each other to disengage the first end from the receiver and mate with each other to collectively form a graspable handle to remove the detach the removable panel from the fixed panel. A vibration attenuation feature is provided at the first end that, when the first end of the rotatable latch is engaged with the receiver, attenuates vibrations experienced by the window system during operation of the vehicle, and when the first end of the rotatable latch is mated with the adjacent rotatable latch, the vibration attenuation feature is configured to mate with the first end of the adjacent rotatable latch to form the graspable handle.

According to the second aspect, the first end of each rotatable latch includes a recess configured for receipt of the vibration attenuation feature of the adjacent rotatable latch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
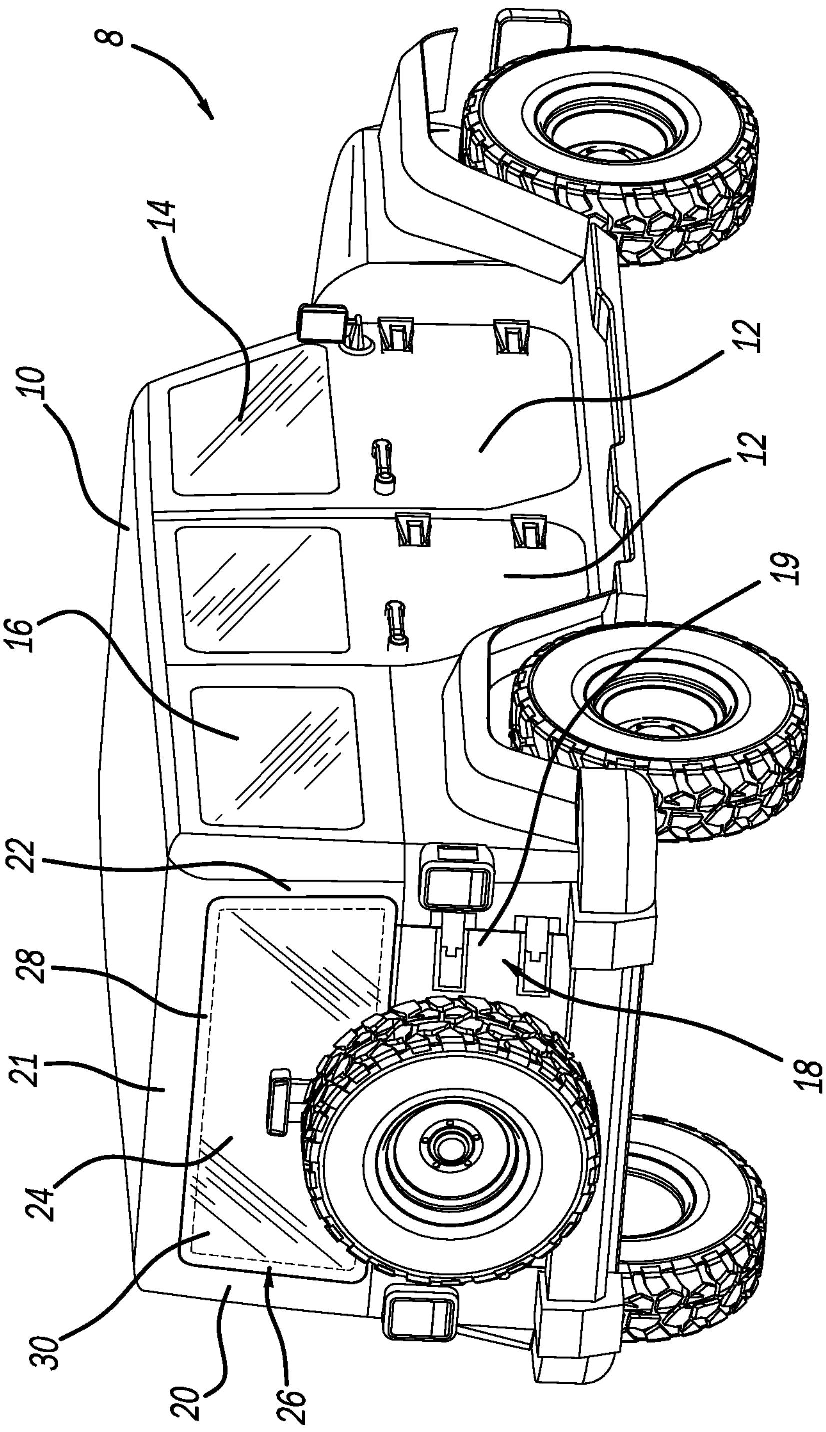
FIG. 1 illustrates an example vehicle having a two-piece window system having a removable glass panel according to a principle of the present disclosure.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a vehicle 8 having a body 10. Body 10 defines a plurality of openings that are each configured for receipt of a movable body such as a vehicle door 12 that may each include a window 14. Body 10 also includes openings that are configured for receipt of a quarter-panel window 16. In addition, vehicle 8 may include a movable body such as a swing gate assembly 18 attached to a rear 20 of body 10 that includes an opening 22 configured for receipt of a rear window 24. Swing gate assembly 18 includes a swing gate 19 that is pivotably attached to body 10, and a fixed swing gate header 21 that defines opening 22 configured for receipt of rear window 24.

As is known in the art, vehicle doors 12 may be removed from vehicle 8 to provide a more open-air experience while operating the vehicle 8, or the windows 14 of the vehicle doors 12 may be lowered to provide the more open-air experience. The rear window 24, however, is typically not removable. According to the present disclosure, rear window 24 may be a two-piece window system 26 including a fixed panel 28 and a removable panel 30 that may be removed to provide a more open-air experience while operating vehicle 8.

Fixed panel 28 and removable panel 30 may each be formed of glass, or fixed panel 28 and removable panel 30 may each be formed of a transparent non-glass material such as, for example, polycarbonate or some other type of polymeric material. Alternatively, fixed panel 28 may be formed of a transparent non-glass material and removable panel 30 may be formed of a glass material, or vice versa. Regardless, in order to permit removable panel 30 to be removed from the swing gate 18, removable panel 30 may secured to the fixed panel 28 using a plurality retention features 32 (FIG. 2), and retention features 32 enable removable panel 30 to be easily and quickly removed from two-piece window system 26.

Figure 2:
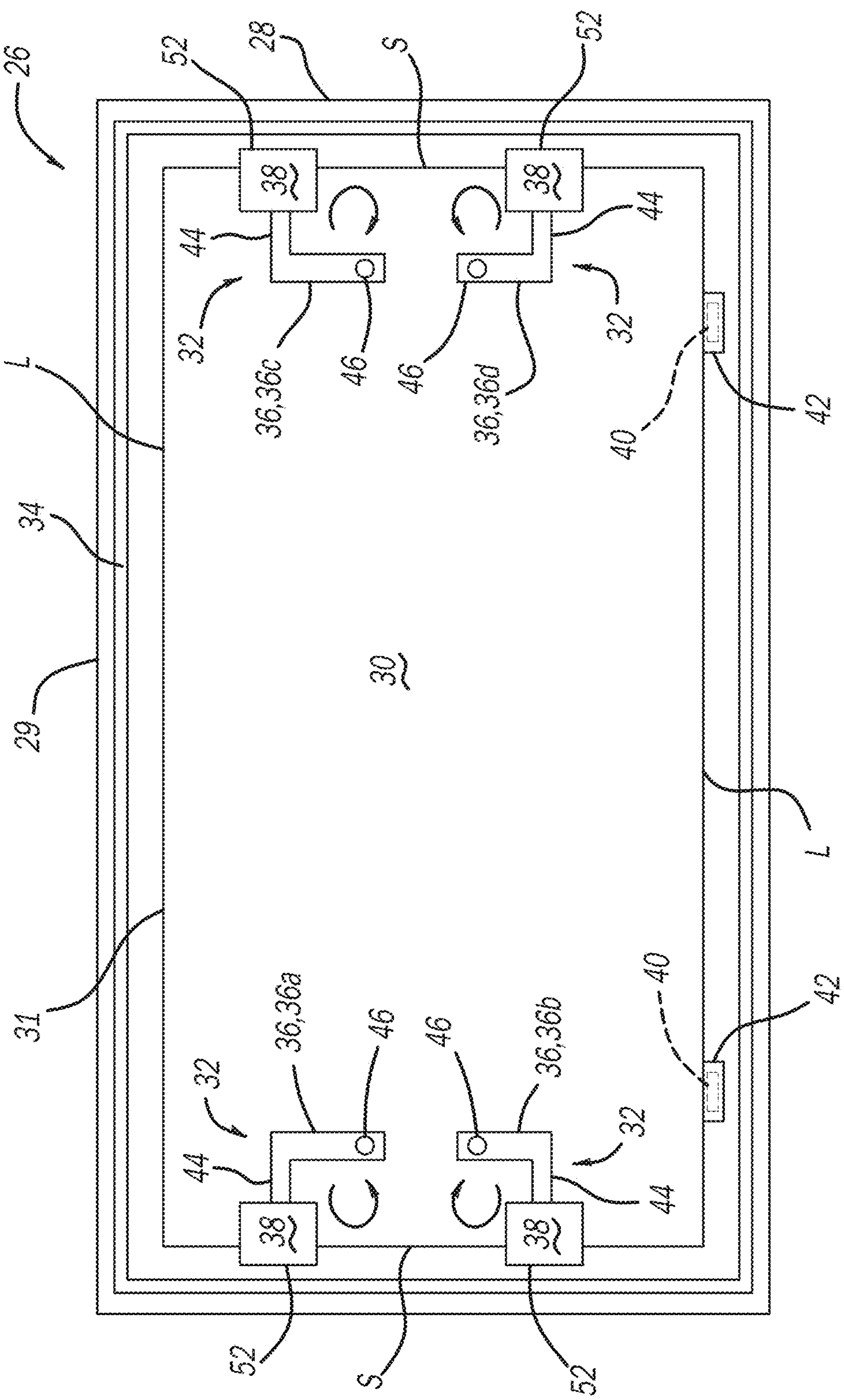
FIG. 2 is a schematic representation of a two-piece window system according to a principle of the present disclosure.

Referring to FIG. 2, removable panel 30 is a generally rectangular-shaped panel having a pair of long sides L that are connected to each other by a pair of short sides S, and the retention features 32 are located along the short sides S. It should be understood, however, that the retention features 32 may be located along long sides L, or a pair of the retention features 32 may be formed along the short sides S and a pair of retention features 32 may be formed along the long sides L without departing from the scope of the present disclosure.

Still referring to FIG. 2, two-piece window system 26 is schematically illustrated in a state before two-piece window system 26 has been attached to swing gate header 21. Window system 26 includes fixed panel 28 that defines a perimeter of rear window 24 and removable panel 30 that is attached to fixed panel 28 using retention features 32. While fixed panel 28 is shown in FIG. 1 as being visible for illustration purposes, it should be understood that fixed panel is generally not visible from an exterior of vehicle 8 when attached to swing gate header 21. Put another way, the width of fixed panel 28 is about the same as or less than the width of swing gate header 21 such that fixed panel 28 is hidden from view from an exterior of vehicle 8 when attached to swing gate header 21.

Fixed panel 28 includes an outer perimeter 29 and an opening 31 that is covered by removable panel 30 when removable panel 30 is attached to fixed panel 28 using retention features 32. To ensure a fluid-tight seal between swing gate 18 and fixed panel 28, a sealant 34 may be provided along a perimeter of fixed panel 28 that adhesively fixes fixed panel 28 to swing gate header 21. Sealant 34 may be formed of, for example, a urethane material or any other type of sealant/adhesive material known to one skilled in the art. It should be understood, however, that fasteners (not shown) that fixedly attach fixed panel 28 to swing gate 18 may be used in addition to sealant 34.

Retention features 32 may each include a movable latch 36 attached to removable panel 30 that are configured to mate with a receiver 38 that is attached to fixed panel 28, the operation of which will be described in more detail later. In addition, it should be noted that removable panel 30 may include a pair of locator pins 40 attached to a lower side S of the removable panel 30 that are configured to be received in a pair of brackets 42 that are attached to fixed panel 28.

In the illustrated embodiment, movable latches 36 may be L-shaped members having a first end 44 that is configured to mate with a receiver 38 and an opposite second end 46 that is rotatably attached to removable panel 30. Latches 36 may be formed of a rigid material such as a metal material such as steel or aluminum, or a rigid polymeric material such as polyamide (e.g., Nylon®).

Latches 36 are designed to rotate about ninety degrees. For example, a first movable latch **36*a* of the movable latches 36 is designed to rotate in a counter-clockwise direction and a second movable latch 36*b* is designed to rotate in a clockwise direction. When each of these latches 36*a* and 36*b* are rotated in this manner to disengage from receivers 38, the first end 44 of latch 36*a* will either abut or be located very near to the first end 44 of latch 36*b*. When the first ends 44 of each latch 36*a* and 36*b* are in this position, the pair of latches 36*a* and 36*b* collectively form a graspable handle 48**.

Latches **36*c* and 36*d* operate in a manner similar to latches 36*a* and 36*b*. Specifically, latch 36*c* is designed to rotate in a clockwise direction to disengage from receiver 38 and latch 36*d* is designed to rotate in a counter-clockwise direction such that first end 44 of latch 36*c* will either abut or be located very near to the first end 44 of latch 36*d*, and collectively form a graspable handle 48. When latches 36 are rotated to disengage from receivers 38, and adjacent pairs of latches 36 (i.e., latches 36*a* and 36*b*, and latches 36*c*, 36*d*) collectively form graspable handles 48 (FIGS. 6 and 7), the handles 48 may be grasped by an operator and removable panel 30 can be lifted to disengage pins 40 from brackets 42 to remove removable panel 30 from window system 26. Notably, it should be understood that to remove removable panel 30 from window system 26, the operator may first open swing gate 19 to obtain access to latches 36. This is advantageous when vehicle 8 includes an externally mounted spare tire 50. Put another way, if latches 36 were located exterior to vehicle 8, the tire 50 would obstruct access to latches 36 and require the operator to lift the removable panel 30 over the tire 50**, which can be difficult.

Receivers 38 may be in the form of a flange 52 that is bonded to fixed panel 28 or connected to fixed panel 28 using a fastener (not shown). When first end 44 of latch 36 is positioned between flange 52 and fixed panel 28, latches 36 prevent removable panel 30 from being removed from window system 26. Flanges 52 may be formed of materials similar to latches 36. That is, flanges 52 may be formed of a metal material such as steel or aluminum, or a rigid polymeric material such as polyamide.

Figure 3:
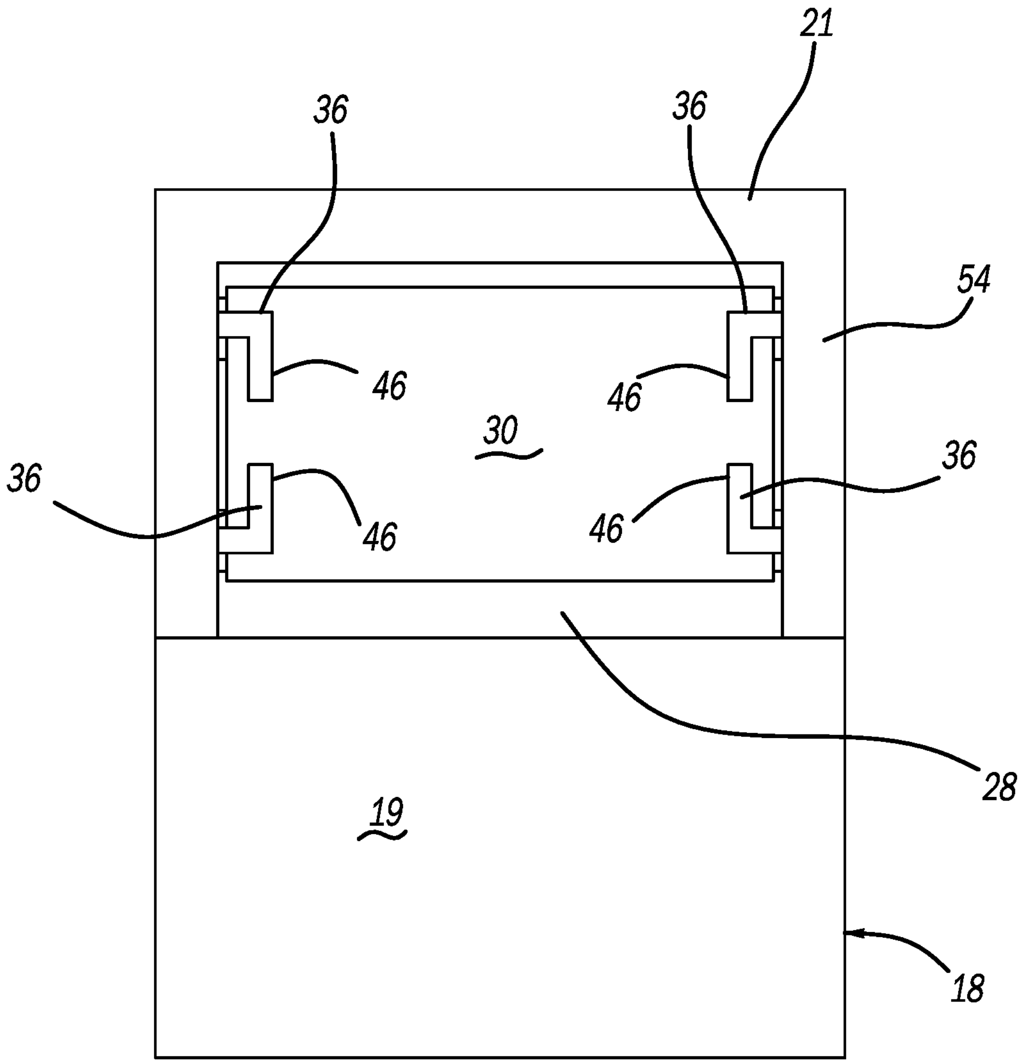
FIG. 3 illustrates the two-piece window system of FIG. 2 when installed on a movable body of the vehicle illustrated in FIG. 1, as viewed form an interior of the vehicle.

FIG. 3 illustrates fixed panel 28 installed to swing-gate assembly 18, when viewed from an interior of vehicle 8. As can be seen in FIG. 3, a majority of fixed panel 28 is obscured from view by an interior trim piece 54 attached to swing-gate header 21, and flanges 52 are hidden from view. Moreover, when removable panel 30 is attached to fixed panel 28, only second ends 46 of latches 36 will be visible. Nonetheless, latches 36 are still able to be grasped and rotated latches 36 toward each other to form graspable handle 48. In other words, latches 36 are designed so as to not substantially obstruct visibility though removable panel 30 and window system 26.

Now referring to FIGS. 4-7, another two-piece window system 60 according to the present disclosure will be described. System 60 is substantially similar to system 26, described above. The primary difference between system 60 and system 26 is that the receiver 38 is attached to swing-gate header 21 rather than fixed panel 28.

Figure 5:
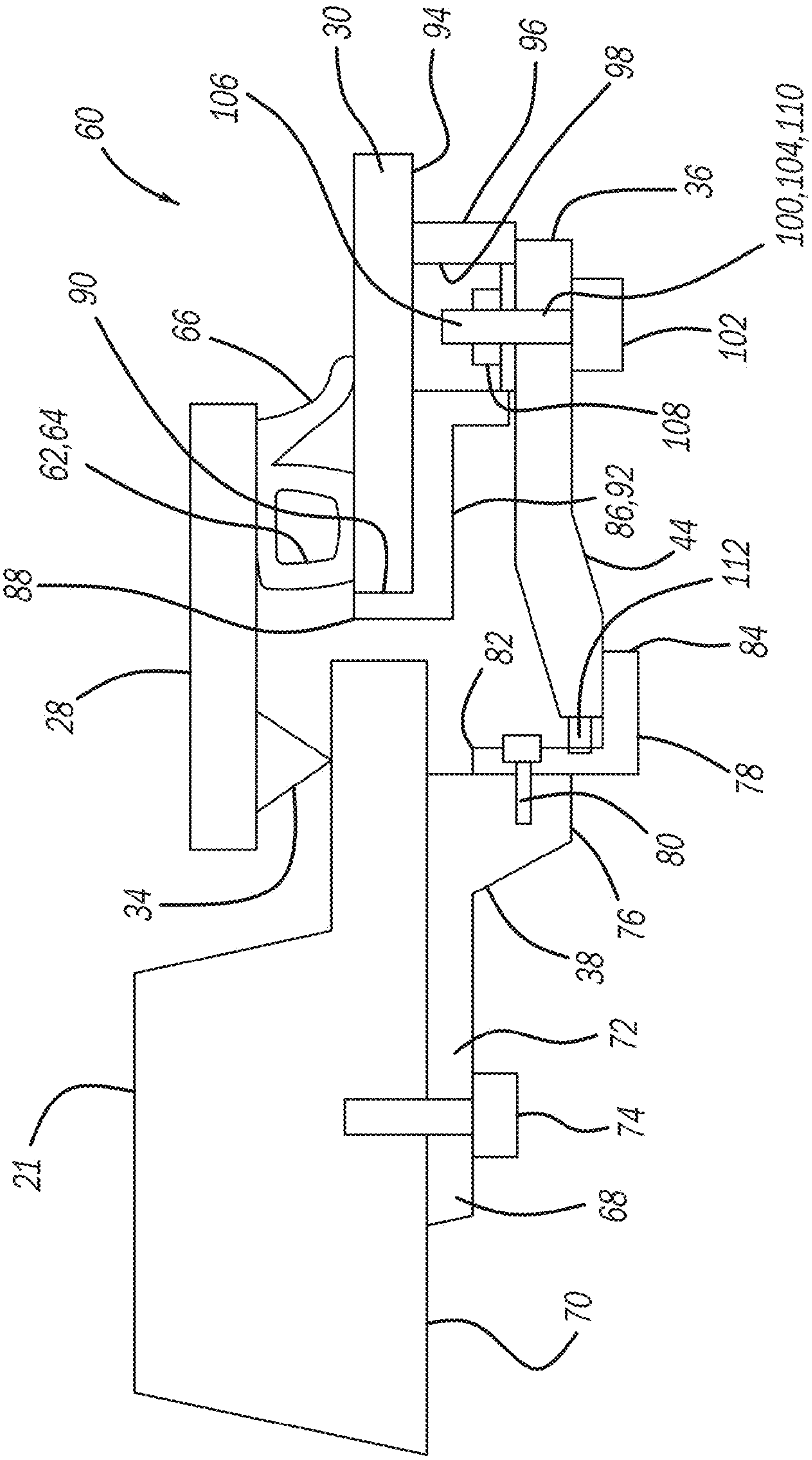
FIG. 5 is a cross-sectional view along line 5-5 of FIG. 4.

In the illustrated embodiment, two-piece window system 60 includes a fixed panel 28, a removable panel 30, sealant 34, and movable L-shaped latches 36. In addition, as best shown in FIG. 5, a seal 62 formed from a polymeric material such as rubber having a primary seal member 64 and a dust lip 66 may be positioned between fixed panel 28 and movable panel 30 for preventing the intrusion of dust and/or moisture into vehicle 8. Seal 62 may extend along an entirety of opening 31 of fixed panel 28.

Still referring to FIG. 5, it can be seen that receivers 38 attached to swing-gate header 21 includes a first arm 68 that extends along a face 70 of header 21. First arm 68 includes a proximate end 72 attached to face 70 using a fastener 74, and a distal end 76. An L-shaped second arm 78 is attached to distal end 76 using another fastener 80. L-shaped second arm 78 includes a first leg 82 attached to distal end 76 using fastener 80, and a second leg 84 that extends outward from first leg 82 and is configured to mate with first end 44 of latch 36.

FIG. 5 also illustrates an example connection between latches 36 and removable panel 30. In this regard, removable panel 30 includes a flange 86 bonded thereto. Flange 86 includes a first section 88 attached to an edge 90 of removable panel 30, a second section 92 connected to first section 88 that extends along an interior surface 94 of removable panel 30, and a third section 96 connected to an extending outward from second section 92. Third section 96 defines an aperture 98 configured for receipt of a pivot pin 100 that permits latch 36 to rotate relative to removable panel 30. Pivot pin 100 includes a head 102 and a shank 104. Shank 104 may include a threaded section 106 for threadingly engaging a nut 108 located within aperture 98. Alternatively, aperture 98 may be threaded. Regardless, a portion of shank 104 between head 102 and nut 108 may be a smooth cylindrical surface 110 that permits latch 36 to easily pivot thereabout.

Second end 46 of latch 36 is attached to pivot pin 100. First end 44 of latch 36, as noted above, is configured to engage with second arm 78 of receiver 38. In addition, first end 44 may include a vibration attenuation feature that may be a spring-loaded ball 112 attached thereto such that when first end 44 engages with second arm 78, spring-loaded ball 112 is compressed. Spring-loaded ball 112 may be formed of, for example, a polymeric material. Spring-loaded ball 112, therefore, may dampen vibrations experienced between latch 36 and receiver 38 when removable panel 30 is attached to fixed panel 28 and the vehicle is being driven.

Figure 4:
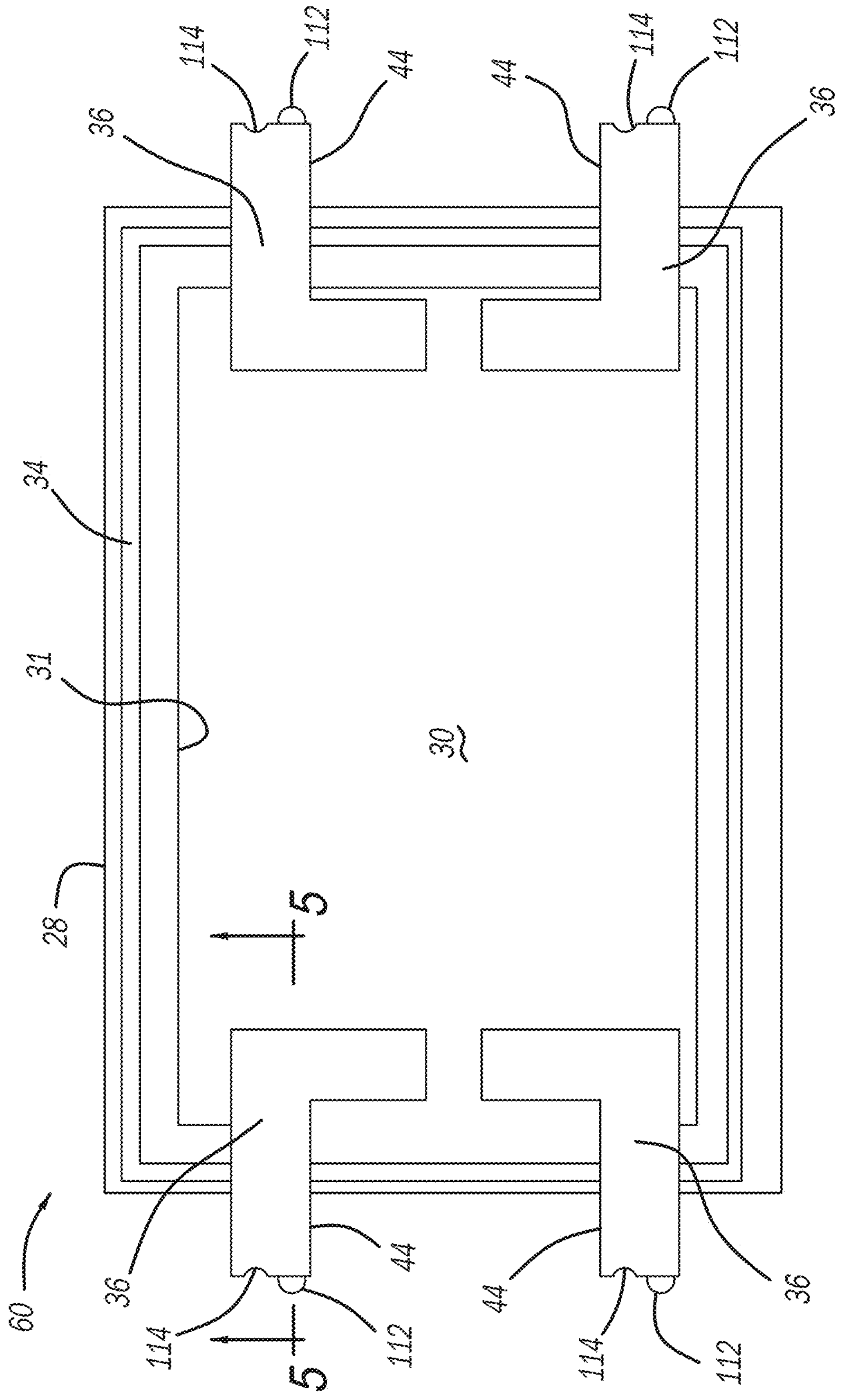
FIG. 4 is a schematic representation of a two-piece window system according to another principle of the present disclosure.

In addition to vibration attenuation between latches 36 and receivers 38, spring-loaded ball 112 assists in maintaining engagement between latches 36 and receivers 38 to maintain removable panel 30 in the installed state. Moreover, as best shown in FIG. 4, first end 44 of latch 36 may also include a recess 114 at a location adjacent to spring-loaded ball 112 where recess 114 is configured for receipt of a spring-loaded ball 112 of an adjacent latch 36, as will be described in more detail below.

Figure 6:
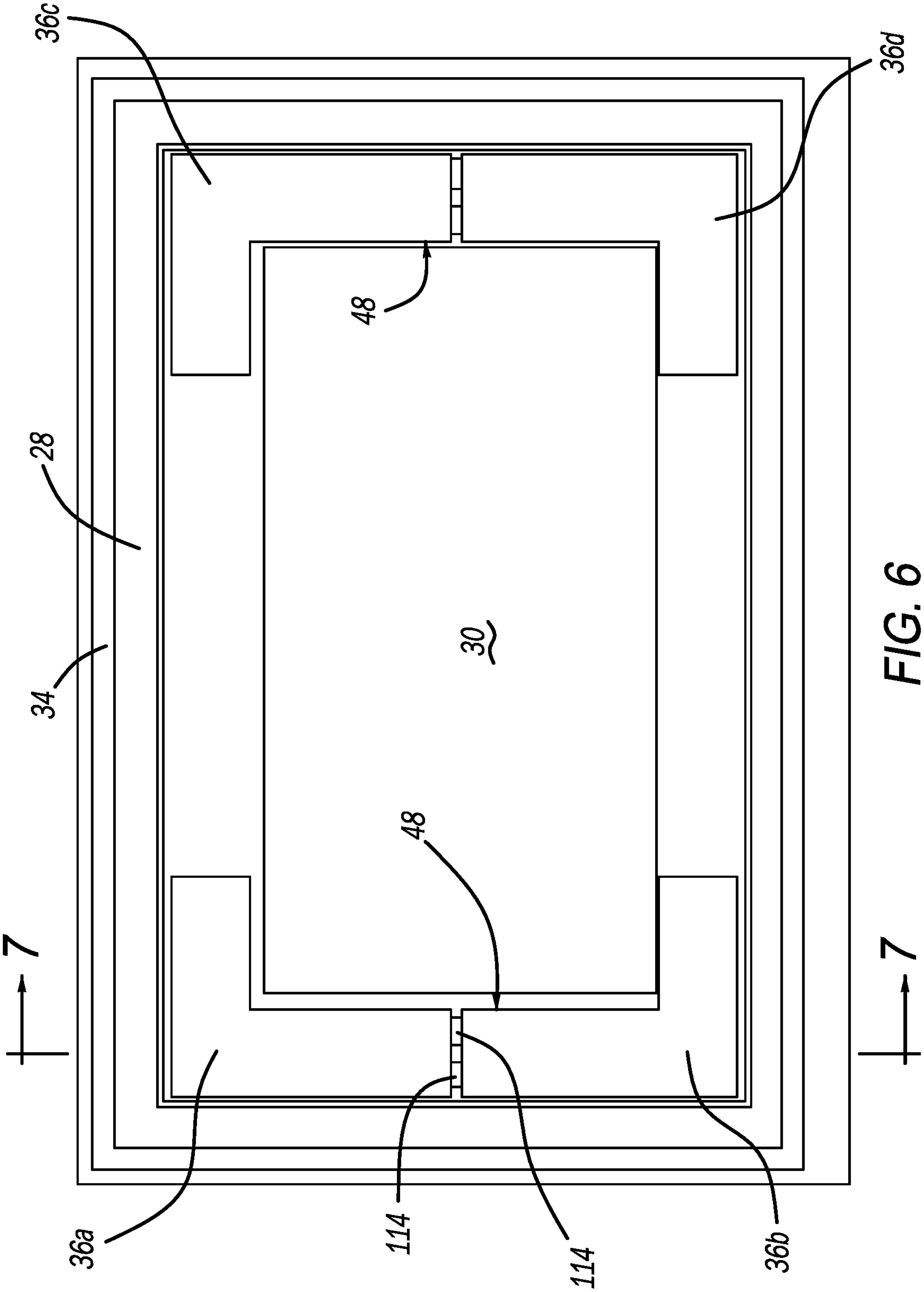
FIG. 6 is another schematic representation of the two-piece window system illustrated in FIG. 4.
Figure 7:
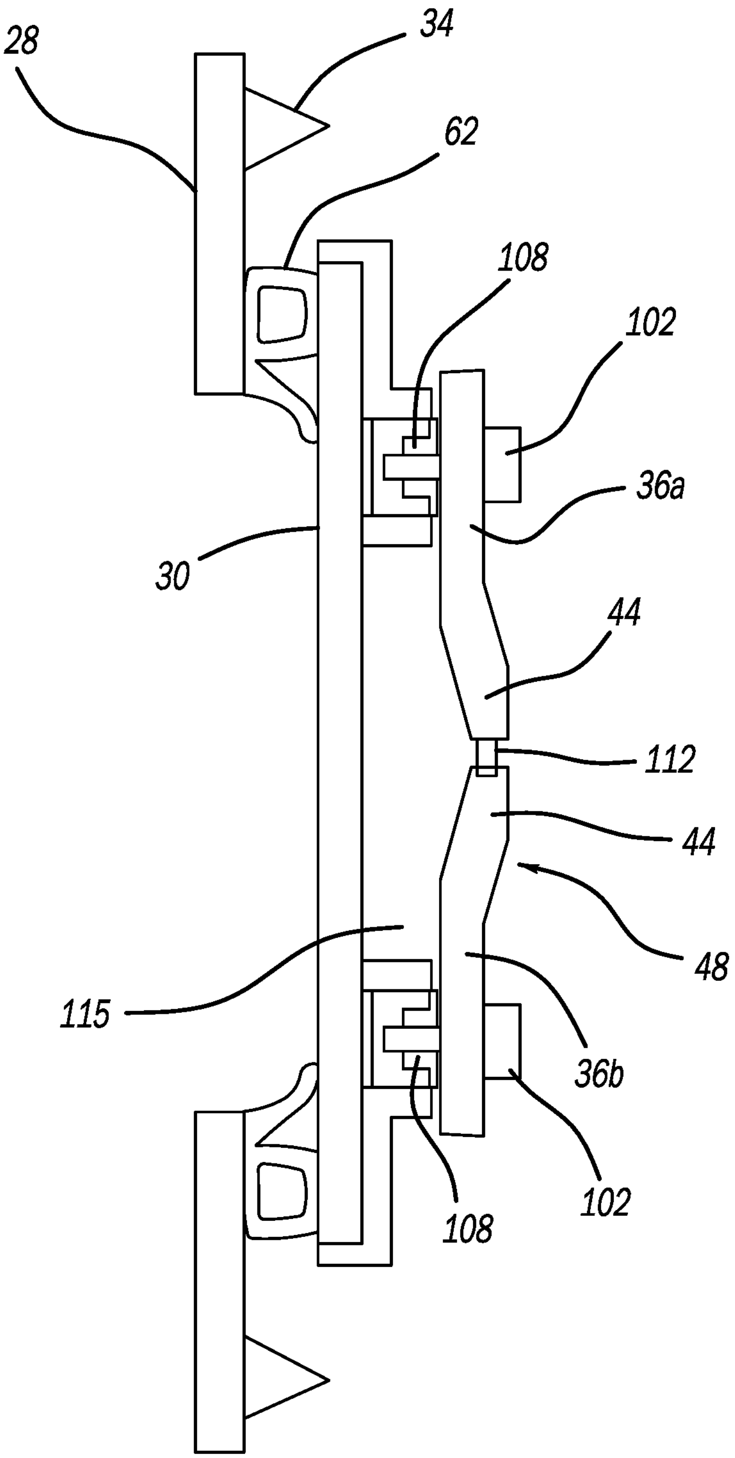
FIG. 7 is a cross-sectional view along line 7-7 of FIG. 6.

Now referring to FIGS. 6 and 7, it can be seen that latches 36 have been rotated to disengage from receivers 38 and form the graspable handle 48. In this state, the spring-loaded ball of one latch **36*a* can mate with the recess 114 of an adjacent latch 36*b* and maintain latches 36*a*, 36*b* in state where graspable handle 48 is formed. As best shown in FIG. 7, the formation of graspable handle 48 provides a space 115 for an operator to insert a hand between handle 48 and removable panel 30 and grasp handle 48. Accordingly, the operator can grasp the handle 48 and remove removable panel 30 from two-piece window system 60**.

Figure 8:
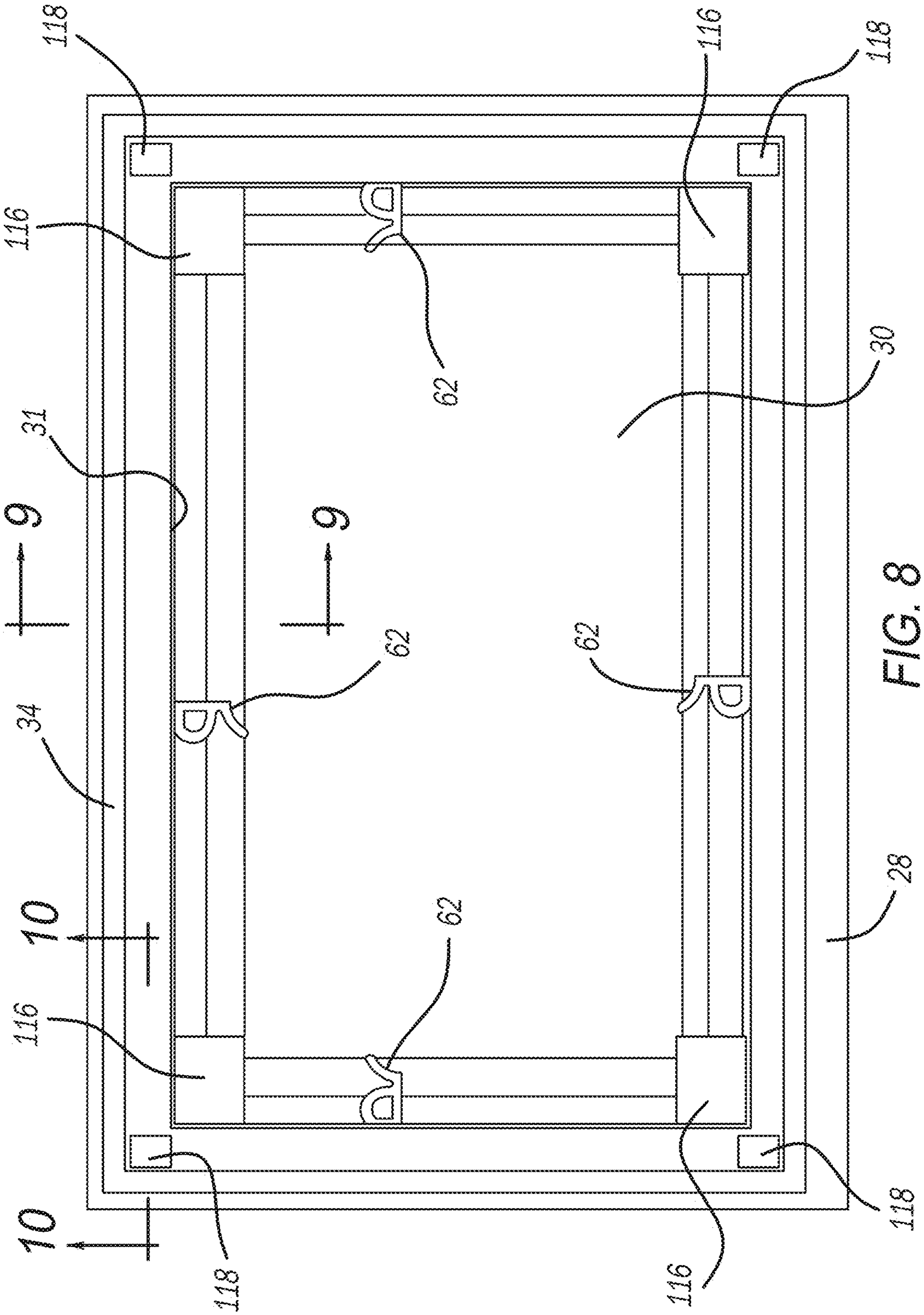
FIG. 8 is a schematic representation of the two-piece window system illustrated in FIG. 4, with latches removed.

FIGS. 8-11 illustrate two-piece window system 60 in a state where latches 36 have been removed to make it easier to view various features of two-piece window system 60 that assist in locating movable panel 30 relative to fixed panel 28, and assist in locating two-piece window system 60 relative to swing gate header 21. As best shown in FIG. 8, it can be seen that seal 62 including primary seal member 64 and dust lip 66 extends around a perimeter of opening 31 of fixed panel 28. Seal 62 also includes molded corners 116. The use of molded corners 116 assists with locating removable panel 30 relative to fixed panel 28 when attaching removable panel 30 to fixed panel. In this regard, corners of removable panel 30 may be aligned with molded corners 116 of fixed panel before locating pins 40 are mated with brackets 42. After mating pins 40 with brackets 42 (see, e.g., FIG. 2) removable panel 30 may be tilted toward fixed panel 28 and latches 36 can be engaged with receivers 38.

Figure 9:
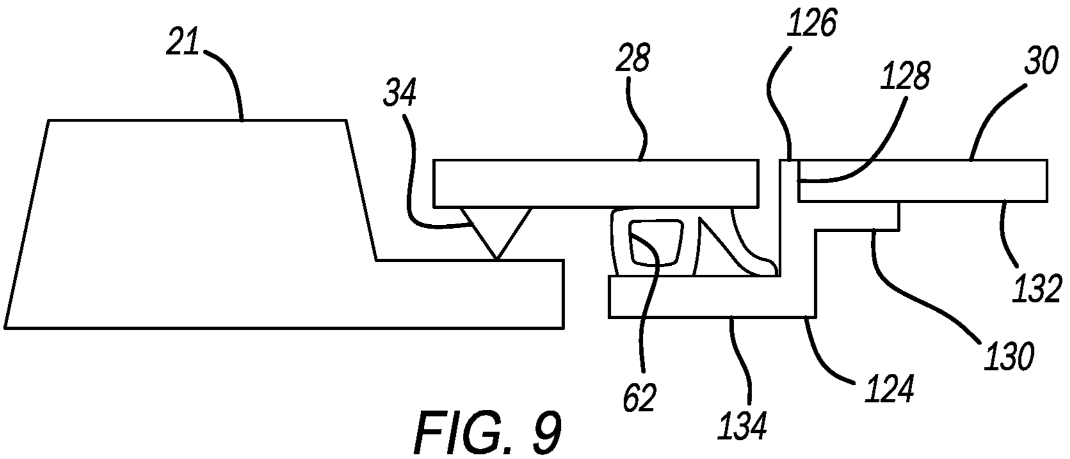
FIGS. 9 and 10 are cross-sectional views of two-piece window assemblies in a flushly mounted configuration (FIG. 9) and an offset mounted configuration (FIG. 10)
Figure 10:
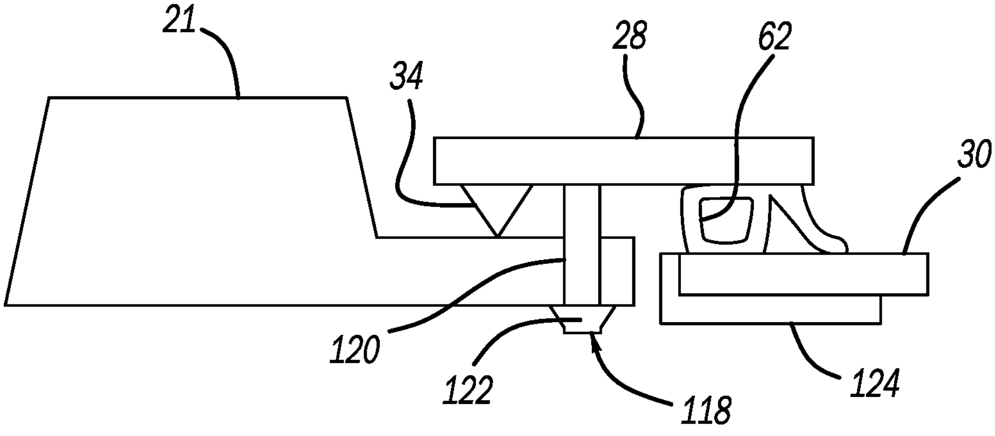
Figure 11:
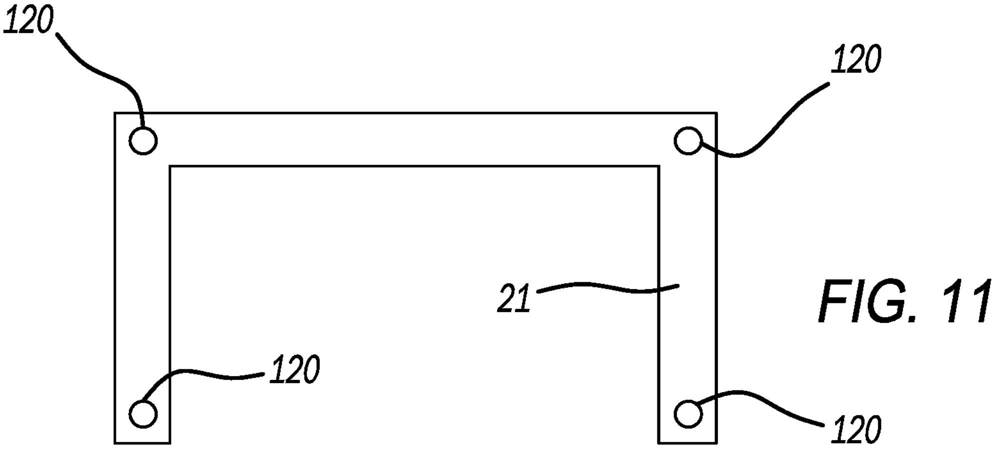
FIG. 11 is a perspective view of an example movable body configured for receipt of two-piece window assembly.

As best shown in FIGS. 9 to 11, fixed panel 28 may include locator clips 118 (FIGS. 9 and 10) bonded thereto that are configured to mate with through-holes 120 formed in swing-gate header 21 (FIG. 11). In the illustrated embodiment (FIG. 8), locator clips 118 are located inboard from sealant 34, which prevents dust and/or moisture from reaching the interface between locator clip 118 and through-hole 120. To mate fixed panel 28 to swing-gate header 21, locator clips 118 may be bonded to fixed panel 28 and sealant 34 applied around a perimeter of fixed panel 28 with locator clips 118 being located inboard therefrom. Then, an installer can mate locator clips 118 with through-holes 120 of swing-gate header 21 and apply pressure to force a tab 122 of clip 118 into engagement with through-hole 120. Sealant 34 is then permitted to cure. While FIG. 8 illustrates the use of four locator clips 118, it should be understood that a greater number of clips 118 can be used if desired.

FIGS. 9 and 10 illustrate that removable panel 30 can be flush-mounted to fixed panel 28 (FIG. 9) or under-flush-mounted (i.e., offset) to fixed panel 28 (FIG. 10). When removable panel 30 is flush-mounted to fixed panel 28, removable panel 30 includes an encapsulant 124 that is bonded to and extends about a perimeter of removable panel 30. Encapsulant 124 may be formed of a metal material such as aluminum or steel, or a rigid polymeric material such as polyamide. As shown in FIG. 9, encapsulant 124 may include a first portion 126 that extends along an edge 128 of removable panel 30. A second portion 130 is connected to and extends outward from first portion 126, with second portion 130 extending along a face 132 of removable panel 30. A third portion 134 is connected to and extends outward from first portion 126. Third portion 134 extends in a direction that is opposite to that of second portion 130 and serves a sealant receiving portion for seal 62.

When removable panel 30 is under-flush-mounted (FIG. 10) to fixed panel 28, the seal 62 is located directly between fixed panel 28 and removable panel 30 such that fixed panel 28 is spaced apart from removable panel 30. While removable panel 30 is illustrated as having an encapsulant 124, encapsulant 124 does not include third portion 130.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a vehicle body including a movable body attached thereto, the movable body defining an opening configured for receipt of a window system;

the window system including:

a fixed panel that is fixed to the movable body;

a removable panel that is configured to be attached to and detached from the fixed panel; and a plurality of retention features that are configured to attach the removable panel to the fixed panel, wherein the plurality of retention features each include a rotatable latch attached to the removable panel that is configured to engage with a receiver to attach the removable panel to the fixed panel;

wherein each of the rotatable latches are L-shaped members including a first end configured to engage with the receiver when the removable panel is attached to the fixed panel, and a second end that is rotatably attached to the removable panel; and wherein the first ends of adjacent rotatable latches are configured to directly mate with each other when the first ends are rotated in a direction toward each other to collectively form a graspable handle when the removable panel is to be detached from the fixed panel.

2. The vehicle according to claim 1, wherein each of the rotatable latches are configured to rotate 90 degrees.

3. The vehicle according to claim 1, wherein each of the rotatable latches include a vibration attenuation feature at the first end that, when the first end of the rotatable latch is engaged with the receiver, attenuates vibrations experienced by the window system during operation of the vehicle; and when the first end of the rotatable latch is mated with the adjacent rotatable latch, the vibration attenuation feature is configured to directly mate with the first end of the adjacent rotatable latch.

4. The vehicle according to claim 3, wherein the first end of each rotatable latch includes a recess configured for receipt of the vibration attenuation feature of the adjacent rotatable latch.

5. The vehicle according to claim 1, wherein the movable body is a swing-gate including a swing-gate header that defines the opening.

6. The vehicle according to claim 5, wherein the receiver is attached to the swing-gate header.

7. The vehicle according to claim 5, wherein the fixed panel includes a plurality of locator clips bonded thereto that are configured to mate with a through-hole formed in the swing-gate header.

8. The vehicle according to claim 1, further comprising a seal positioned between the fixed panel and the removable panel.

9. The vehicle according to claim 8, wherein the seal is attached to the fixed panel.

10. The vehicle according to claim 8, wherein the seal includes a molded corner configured as an alignment feature to align the removable panel relative to the fixed panel when attaching the removable panel to the fixed panel.

11. The vehicle according to claim 1, wherein the removable panel is configured to be flushly aligned with the fixed panel when the removable panel is attached to the fixed panel.

12. The vehicle according to claim 1, wherein the removable panel is configured to be offset from the fixed panel when the removable panel is attached to the fixed panel.

13. The vehicle according to claim 1, wherein when the adjacent rotatable latches collectively form the graspable handle, a space is provided between the graspable handle and the removable panel that is configured for receipt of an operator's hand.

14. The vehicle according to claim 1, wherein each of the fixed panel and the removable panel are formed of glass.

15. A vehicle comprising:

a vehicle body including a swing-gate pivotably attached thereto, the swing-gate defining an opening configured for receipt of a two-piece window system including:

a fixed panel that is fixed to the swing-gate;

a removable panel that is configured to be attached to and detached from the fixed panel; and a plurality of retention features that are configured to attach the removable panel to the fixed panel, wherein the plurality of retention features each include an L-shaped rotatable latch that includes a first end configured to engage with a receiver and an opposite second end rotatably attached to the removable panel;

wherein adjacent rotatable latches are configured to rotate in a direction toward each other to disengage the first end from the receiver and directly mate the first ends that are disengaged from the receiver with each other to collectively form a graspable handle to remove the removable panel from the fixed panel;

wherein a vibration attenuation feature is provided at the first end that, when the first end of the rotatable latch is engaged with the receiver, attenuates vibrations experienced by the window system during operation of the vehicle; and when the first end of the rotatable latch is mated with the first end of the adjacent rotatable latch, the vibration attenuation feature is configured to directly mate with the first end of the adjacent rotatable latch to form the graspable handle.

16. The vehicle according to claim 15, wherein the first end of each rotatable latch includes a recess configured for receipt of the vibration attenuation feature of the adjacent rotatable latch.

* * * * *